United States Patent [19]

Pastor

[11] Patent Number: 4,534,830
[45] Date of Patent: Aug. 13, 1985

[54] SOLVENT RECOVERY METHOD

[75] Inventor: Manuel G. Pastor, Berkeley, Calif.

[73] Assignee: Zerpa Industries, Inc., San Jose, Calif.

[21] Appl. No.: 539,202

[22] Filed: Oct. 5, 1983

Related U.S. Application Data

[60] Division of Ser. No. 485,496, Apr. 22, 1983, Pat. No. 4,457,805, which is a continuation of Ser. No. 250,798, Apr. 3, 1981.

[51] Int. Cl.$^3$ ............................................. B01D 3/02
[52] U.S. Cl. ........................................ 203/86; 203/99; 203/100; 203/DIG. 11
[58] Field of Search ................ 202/152, 163, 168-170, 202/232, 235, 267 R, 83, 164; 203/86, 99, 100, DIG. 11, DIG. 22; 134/10; 159/DIG. 10, DIG. 33, DIG. 41

[56] References Cited

U.S. PATENT DOCUMENTS

| | | | |
|---|---|---|---|
| 686,772 | 11/1901 | Seltzer | 202/164 |
| 3,890,988 | 6/1975 | Lee | 210/167 |
| 4,323,429 | 4/1982 | Hoover | 202/206 |

OTHER PUBLICATIONS

U.S. PTO, Classification Definitions; Class 203–Distillation: Processes, Separatory; pp. 203-205; Jul. 1973.

Primary Examiner—Frank Sever
Attorney, Agent, or Firm—Townsend and Townsend

[57] ABSTRACT

A method for recovering clean solvent from a mixture of solvent and contaminants. An open top tank is mounted in a housing below a sink in which articles to be cleaned with solvent are placed. The sink has a tap through which solvent is directed so that the articles can be cleaned by hand in the sink itself. A disposable, plastic bag is receivable in the tank and the tank is closed by a cover. Contaminated solvent can flow from the sink, through the cover and into the bag in the tank. Contaminated solvent in the bag is heated by heating a liquid surrounding the side wall of the tank and below the bottom of the tank so that the solvent in the bag will vaporize. A tube leading out of the tank carries solvent vapor into a heat exchanger where the vapor is condensed to form clean, liquid solvent, and the liquid solvent is collected in a reservoir. A pump is coupled to the reservoir for pumping liquid solvent to the tap at the sink. The bag can be disposed of after the solvent has been vaporized therefrom. The heating means has an expansion chamber for allowing expansion of the heating liquid as it is heated. The apparatus provides a solvent reclaiming and cleaning station near a location where articles to be cleaned are used.

12 Claims, 3 Drawing Figures

U.S. Patent  Aug. 13, 1985  4,534,830
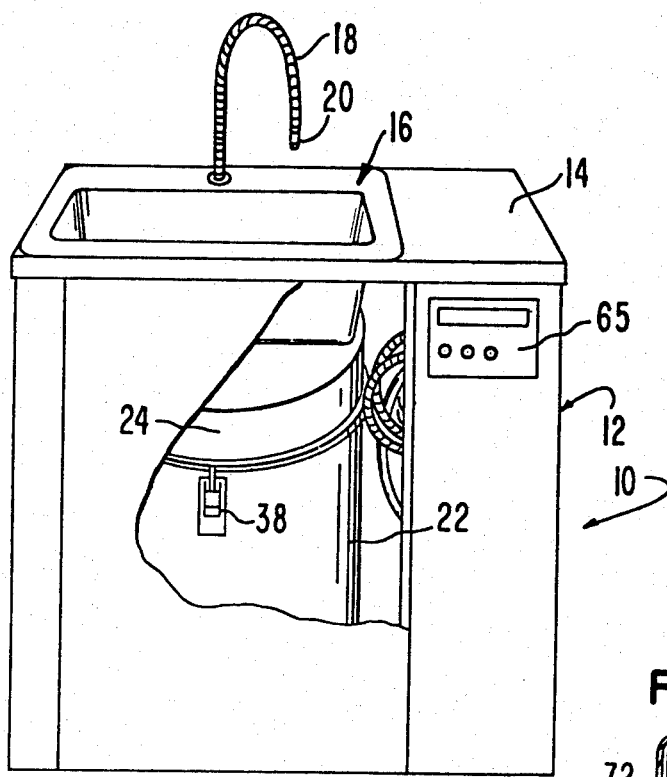
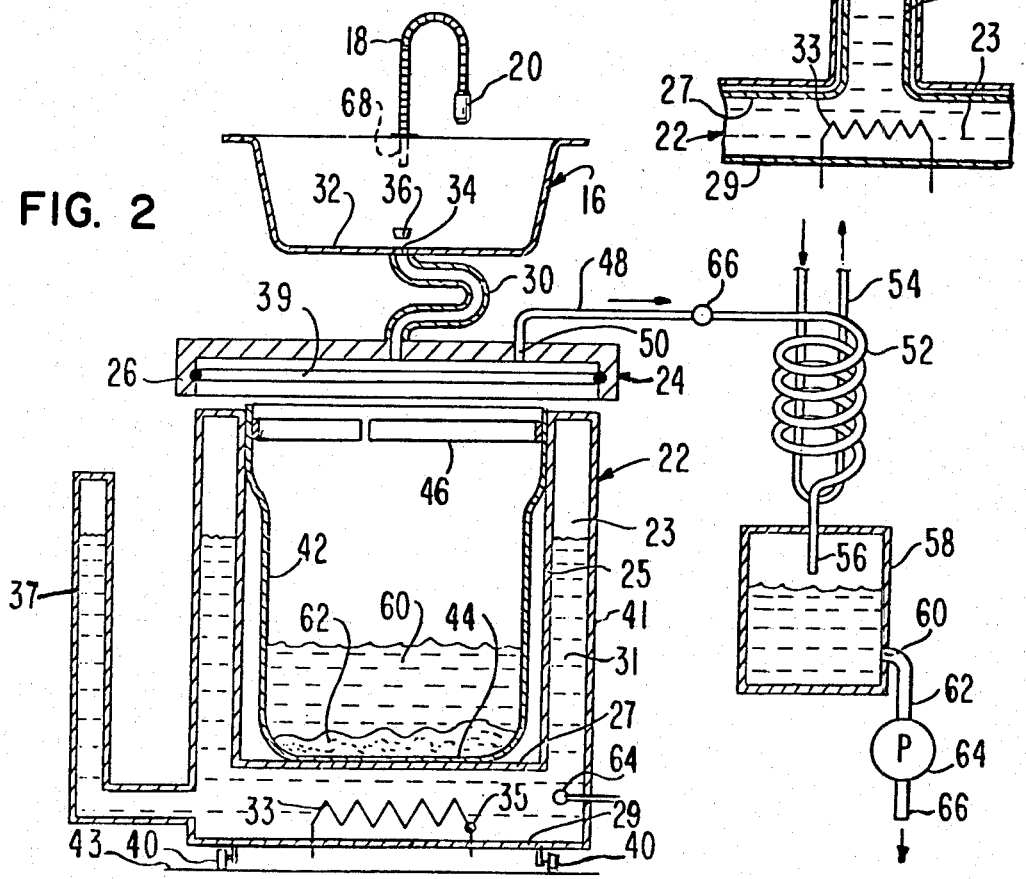

SOLVENT RECOVERY METHOD

This is a divisional patent application of application Ser. No. 485,496, filed Apr. 22, 1983, now U.S. Pat. No. 4,457,805, which was a continuation of application Ser. No. 250,798, filed Apr. 3,1981, now pending.

BACKGROUND OF THE INVENTION

Recovery of solvents, such as lacquer thinner and acetone has been achieved in the past to allow the solvent to be used over and over again. Thus, certain economies can be realized because, instead of disposing of contaminated solvent, the solvent can be heated and reclaimed as clean solvent.

A solvent recovery system which has been known in the past is one entitled Electric Powered Acetone Recovery (EPAR I) manufactured and sold by Equipment Technologies, Inc., Neptune Beach, Fla. This system includes a heater in a housing for receiving contaminated acetone from a large drum separate from the housing. The acetone must be pumped into a solvent receiver in the housing, and when the receiver is sufficiently full, the acetone is heated in the receiver and solvent vapor is collected and condensed to form clean, liquid acetone. The clean acetone is then pumped into a second container separate from the housing in which the solvent is heated. This system is bulky and does not present a single station where articles can be cleaned with solvent and where solvent can be reclaimed for re-use.

Because of the foregoing problems and other problems associated with solvent recovery, a need has arisen for an improved solvent recovery apparatus and method which not only provides a work station where articles to be cleaned by solvent but also provides a station where solvent can be reclaimed for use over and over again and where residue from contaminated solvent can be easily removed.

SUMMARY OF THE INVENTION

The present invention satisfies the aforesaid need by providing a solvent reclaiming and cleaning apparatus and method in which contaminated solvent collected in a sink from the cleaning of articles is drained into a flexible, plastic bag removably carried in a closed tank, following which the contaminated solvent in the bag is heated, vaporized and condensed for collection in a reservoir. All of the foregoing functions are performed in a confined space so that the apparatus of the invention provides a compact work station which can be placed at any suitable location but preferably where the articles to be cleaned are used.

Since the bag is removable from the tank after one or more solvent recovery cycles, the contaminants separated from the solvent can be disposed of quickly and easily without having to empty the tank itself. The heater for the contaminated solvent comprises a high boiling point liquid, such as silicone oil, adjacent to the tank and in heat exchange relationship to the contaminated solvent in the bag. All of the various parts forming the apparatus of the present invention are mounted in a confined space, such as the interior of a housing having the sink at the top thereof.

By the use of the present invention, articles can be cleaned throughout a working day and at the end of the day, a solvent recovery cycle can be initiated and continued until substantially all of the solvent has been separated from the contaminants and recovered as condensed, clean solvent in the reservoir. The bag, when it contains a large amount of contaminants, can be removed from the tank and discarded, following which a new bag can then be inserted in the tank, ready to receive contaminated solvent resulting from the cleaning of articles in the sink.

The primary object of the present invention is to provide an apparatus and a method for forming a work station for the cleaning of articles with a solvent and then reclaiming the solvent for re-use to thereby provide for a reduction in the cost of cleaning articles and to permit the station to be used at a location where articles to be cleaned are actually used.

Another object of the present invention is to provide an apparatus and method of the type described wherein the collection region for contaminated solvent after articles have been cleaned is in the form of a flexible, plastic bag which can be quickly and easily disposed of after solvent has been separated by vaporization from the contaminants.

Other objects of this invention will become apparent as the following specification progresses, reference being had to the accompanying drawing for an illustration of the invention.

IN THE DRAWING:

FIG. 1 is a front, perspective view of the solvent reclaiming and cleaning apparatus of the present invention, parts being broken away to illustrate details of construction;

FIG. 2 is a vertical section of the apparatus, partially schematic, showing a recovery tank below a sink, with the tank having a disposable bag therewithin for receiving contaminated solvent from the sink thereabove; and FIG. 3 is a fragmentary, cross-sectional view of another embodiment of the tank and bag.

The solvent reclaiming and cleaning apparatus of the present invention is broadly denoted by the numeral 10 and includes a housing 12 having a flat top 14 and a sink 16 supported on top 14 and extending into the housing as shown in FIG. 1. A flexible tube 18 extending upwardly from sink 16 has an outlet end 20 which can be moved into various locations over sink 16. Tube 18 and outlet 20 define a tap adapted to be coupled to a reservoir of solvent in the manner hereinafter described to permit solvent to be directed onto one or more articles in sink 16 to clean the articles. A typical use of apparatus 10 is the use of lacquer thinner for cleaning paint brushes, paint rollers, spray guns, hoses and the like. Other solvents that can be used with apparatus 10 are acetone, MEK, alcohol and Freon.

Apparatus 10 further includes an open top tank 22 positioned in housing 12 below sink 16. Tank 22 is double walled to present a closed space 23 surrounding the inner wall 25 of the tank. Also, tank 22 has an inner bottom wall 27 and an outer bottom wall 29 to present a continuation of space 23. A volume of a heating liquid 31 is in space 23 and this liquid is a low viscosity, high boiling point substance, such as silicone oil or similar fluid, that may have a high coefficient of expansion. An open top expansion tube 37 at one side of tank 22 communicates with space 23 and contains liquid 31 to allow for expansion of the liquid when it is heated.

Liquid 31 is adapted to be heated by a resistance heater 33 in the space between bottom walls 27 and 29. A thermostat 35 in the circuit of heater 33 senses the temperature of the heater and causes it to turn off when the temperature exceeds a given value. A control means (not shown) operated from a control panel 65 (FIG. 1) is coupled to the thermostat for effecting the opening and closing of an electrical switch in series with the heater.

Tank 22 has a lid or cover 24 for closing the open top of the tank. The cover has an flange 26 provided with an O-ring seal 39 for engaging tank 22 in sealing relationship thereto.

Cover 24 is coupled by a tube 30 to the bottom 32 of sink 16. The upper end of tube 30 is aligned with a drain opening 34 in bottom 32, and a stopper 36 is used to removably plug opening 34. Typically, pipe 30 is rigid so that cover 24 is in a fixed position relative to sink 16. This will require tank 22 to be slightly elevated when it is to be coupled to cover 24 so that a number of spaced hasps 38 (FIG. 1) can be closed to releasably connect cover 24 to tank 22. For the purpose of moving the tank to gain access to the bag, the tank is typically provided with a number of casters 40 on lower bottom wall 29 and these casters are supported on a support surface 43 on the bottom of housing 12 or, if the housing has no bottom, on the floor beneath housing 12.

Tank 22 is adapted to removably receive a flexible, plastic bag 42 which generally is of the same height as inner side wall 25. The bag has a bottom 44 which is to be supported on inner bottom wall 27 as shown in FIG. 2. The upper, open end of the bag is removably secured to the upper margin of inner wall 25 by a resilient spring member 46, such as a split ring. Other means can be provided for holding the upper end of the bag near the top margin of tank 22.

A tube 48 is coupled with cover 24 and has one end 50 extending through the cover and communicating with bag 42 when the bag is in place as shown in FIG. 2 and when cover 24 closes tank 22. The opposite end of the tube 48 is coupled to a coiled tube 52 which serves as a heat exchanger in heat exchange relationship with a U-shaped tube 54 adapted to contain a coolant, such as cold water. Coil 52 has a lower end 56 which extends into a reservoir 58 having an outlet 60 provided with a fluid line 62 having a fluid pump 64 therein. The outlet 66 of pump 64 is coupled to the inlet end 68 (FIG. 2) of tube 18.

In operation, apparatus 10 defines a work station which permits the cleaning of articles by the use of a solvent. The articles are placed in sink 16 and pump 67 is actuated to cause solvent in reservoir 58 to flow through tube 18 and out of the same through outlet 20 thereof onto the articles in the sink. A bag 42 will have been placed in tank 22 and the tank closed by cover 24 before the cleaning of articles commences.

As cleaning of articles in the sink 16 commences and continues, the contaminated solvent flows out of the sink through tube 30 and into bag 40, assuming drain opening 34 of sink 16 is unplugged. This process can continue off and on throughout a work day, and contaminated solvent will accumulate in the bag. The solvent 60 in the bag may rise above some contaminants 62 which gravitate to the bottom of the bag. Other contaminants may float on the solvent.

After a certain period of time or after a certain volume of solvent has been directed into bag 42, stopper 36 is moved into place covering opening 34, following which heater 30 is actuated to heat the liquid 31 in space 23 and coolant is caused to flow through tube 54. When this occurs, solvent 60 in bag 42 is heated to its boiling point and the solvent vaporizes and passes upwardly as a vapor through tube 48 and through heat exchanger 52 in which it is condensed. Then the liquid solvent gravitates into reservoir 58. A thermostat 65 in space 23 monitors the temperature of liquid 31 and turns heater 33 on or off depending upon the desired operating temperature of liquid 31. A second thermostat 66 in line 48 monitors the temperature of the solvent vapor flowing through line 48. If the solvent vapor appears to be superheated, this means that substantially all of solvent 60 in the bag has been vaporized so that heater 33 can be de-actuated. This will terminate a solvent recovery cycle. This can be done automatically or can be done by way of a timer-actuated cycle.

The material of bag 42 can be of any suitable type which has a high resistance to corrosion and a high melting point. Preferably, it is of Teflon, nylon or polyester, Teflon having a melting point of about 450° to 500° F., well above the boiling point of the solvent. Nylon 6-6 or 6 is also a suitable material for bag 42, such material being capable of withstanding temperatures of at least 350° F. Polyester film is suitable to 300° F.

When apparatus 10 is operating to reclaim solvent, and when there is a modest level of solvent in sink 16, it has been found that removal of stopper 36 results in a sucking of the liquid into bag 42, possibly due to the sudden depressurization and apparent partial vacuum created by the introduction of a cool fluid into contact with heated vapor in the slightly pressurized bag 42. Thus, it is possible to add to the solvent in bag 42 even during a solvent recovery cycle in which heater 33 is operating.

One of the major advantages of the present invention is that there is substantially total solvent recovery since the residue 62 can be completely desiccated. In addition, the thermostatic controls are such that there is sufficiently close and accurate control over the temperature of the solvent and the heating liquid 31 to permit recovery of a variety of solvents such as those mentioned above including lacquer thinner, acetone, alcohol and Freon.

An improvement which could be used with the tank of the present invention is shown in FIG. 3. It relates to a hollow column 70 integral with and extending upwardly from inner bottom wall 27 and communicating with space 23. The column forms a space for heating liquid 31 so as to provide a greater surface area in thermal interchange relationship to the contents of bag 42. To achieve this, the bag is made with a tubular center part 72 which fits over column 70. This feature also avoids the problem which arises when solids 62 collect on the bottom of the bag, thus reducing the efficiency of heat transfer through the bottom of the tank to the solvent above the residue 62 (FIG. 2). By heating both the sides and center of bag 42, this problem is substantially eliminated.

What is claimed is:

1. In a solvent recovery method having a distilling mode and an emptying mode, the improvement comprising:

providing a tank having a heating means for heating the interior of said tank;

placing a plastic bag within said interior of the tank so that at least a part of the bag forms a substantially liquid-tight barrier between contaminated solvent within said bag and said heating means during said distilling mode;

heating the contaminated solvent during the distilling mode to separate clean solvent vapor from the contaminants;

allowing the clean solvent vapor to be directed out of the bag; and removing said plastic bag when it contains a quantity of contaminants during the emptying mode.

2. In a method as set forth in claim 1, wherein said bag is a flexible, open top bag which conforms to said tank when containing a solvent.

3. In a method as set forth in claim 2, wherein the bag is formed from nylon.

4. In a method as set forth in claim 2, wherein is included the step of releasably holding the upper end of the bag to the tank.

5. In a method as set forth in claim 1, wherein said tank has a bottom wall, said placing step including at least partially supporting the bag on the bottom wall.

6. In a method as set forth in claim 5, wherein said heating step includes heating the solvent from below said bottom wall of the tank.

7. In a method as set forth in claim 5, wherein said heating step includes heating the bottom wall and at least part of the side of the tank with a heating fluid.

8. In a method as set forth in claim 7, wherein said heating fluid is silicone oil.

9. In a method as set forth in claim 5, wherein said tank has an open top, and including the step of removably closing the open top of said tank.

10. In a method as set forth in claim 9, wherein is included the steps of providing a cover coupled to the holding region, said closing step including elevating the tank to the cover to close the tank, and releasably securing the cover to the side wall of the tank.

11. In a method as set forth in claim 5, wherein is included the steps of holding articles to be cleaned in a holding region above the tank, and allowing contaminated solvent to flow from the holding region into the bag.

12. Solvent recovery apparatus as set forth in claim 11, wherein is included the step of collecting clean solvent in a reservoir, and pumping clean solvent from the reservoir to the holding region.

* * * * *